Figure 3:
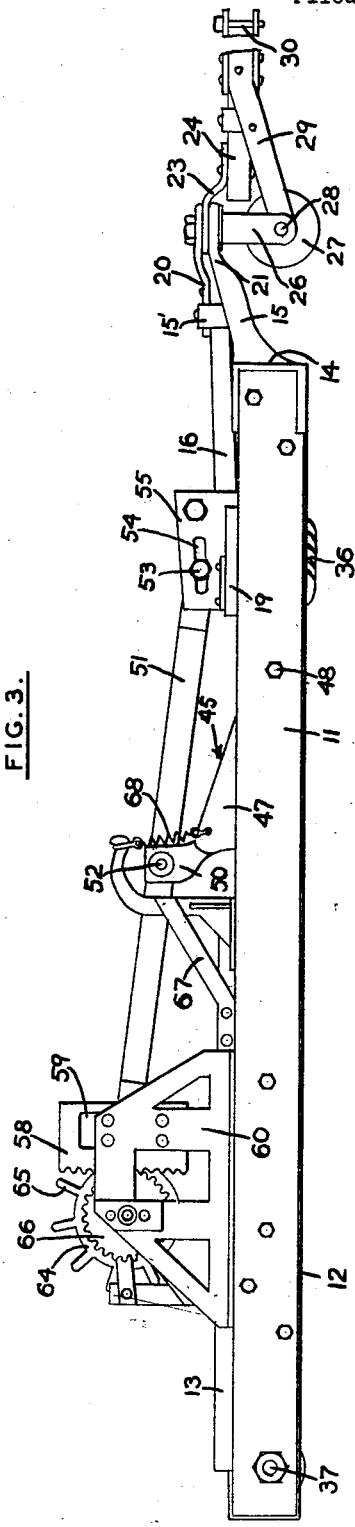

June 21, 1932.   W. E. FISHER   1,864,042
LAND LEVELER
Filed May 21, 1931   2 Sheets-Sheet 1
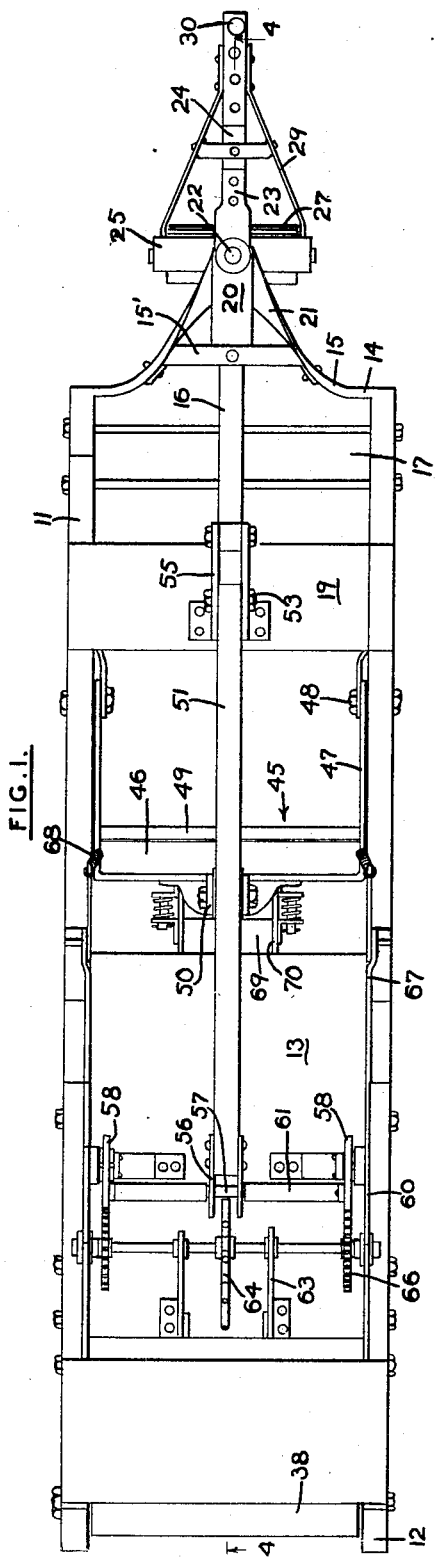
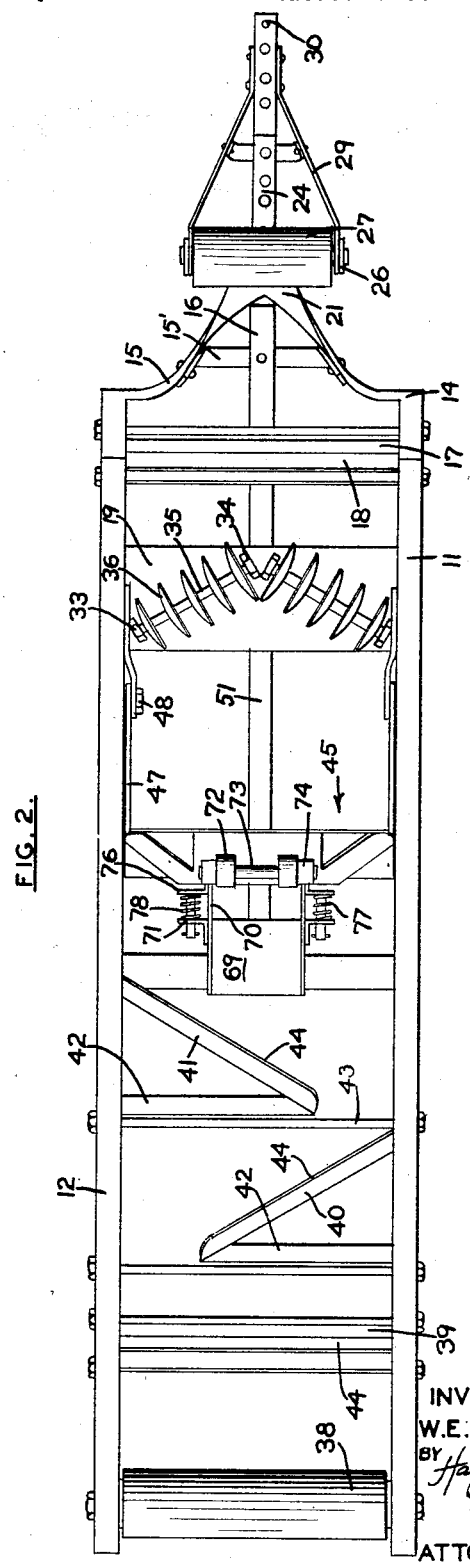
INVENTOR
W.E.FISHER
BY
ATTORNEYS June 21, 1932. W. E. FISHER 1,864,042
LAND LEVELER
Filed May 21, 1931 2 Sheets-Sheet 2

INVENTOR
W. E. FISHER
BY Hazard and Miller
ATTORNEYS

Patented June 21, 1932

1,864,042

UNITED STATES PATENT OFFICE

WILLIAM E. FISHER, OF COMPTON, CALIFORNIA

LAND LEVELER

Application filed May 21, 1931. Serial No. 539,022.

My invention pertains to land levelers particularly adapted for leveling land for irrigation purposes, in which it is necessary to obtain either a flat surface or a more or less uniform slope without small irregularities in the land surface. My invention pertains to a land leveler made in the form of a drag which is designed to be pulled over the ground by a tractor or the like.

An object of my invention is the construction of a drag which has rollers to prevent the drag from operating too deeply in the ground surface and in which there are angularly spaced scrapers to shift the surface soil laterally in order to obtain an even leveling of the soil surface. In cooperation with these, another feature of my invention is the employment of a disk harrow or plows mounted on the machine to cut the surface soil and to distribute said soil evenly in front of the fixed scraper blades.

Another feature and object of my invention is the employment of a soil cutting blade which is adjustable in elevation and is designed to cut off the high ridges in the soil and to carry the earth so cut off to the low places and allow it to be deposited at such low places. This cutting blade is adjustably mounted to vary the depth of cut relative to the general surface of the soil and is arranged to be readily shifted while the land leveler is in use.

Another feature of my invention is the employment of a resiliently mounted backing support for the cutting blade to take the strain of cutting ridges and transporting the soil so cut from the ridges to the low spots.

In constructing my invention I use a drag having a pair of longitudinal skids and these are connected to a draw bar construction which may be hitched to a tractor. The draw bar and the rear part of the skids are mounted on ground rollers preventing the skids from digging into the ground. The skids are provided with a transverse blade at the front and behind this with a set of rotary disks for cutting and turning the soil. Rearwardly of the disks there is the digging and transporting blade which is arranged to shift up and down, and is adjustable to cut to varying depths in relation to the surface of the soil. This cutting blade has a resilient thrust transmitting mounting to relieve the strain on such blade.

The rear part of the machine has inclined, fixed blades which extend partly across from one skid to the other and function to distribute the soil between the skids. The rear portion of the machine has a fixed, transverse, leveling blade.

Figure 4:
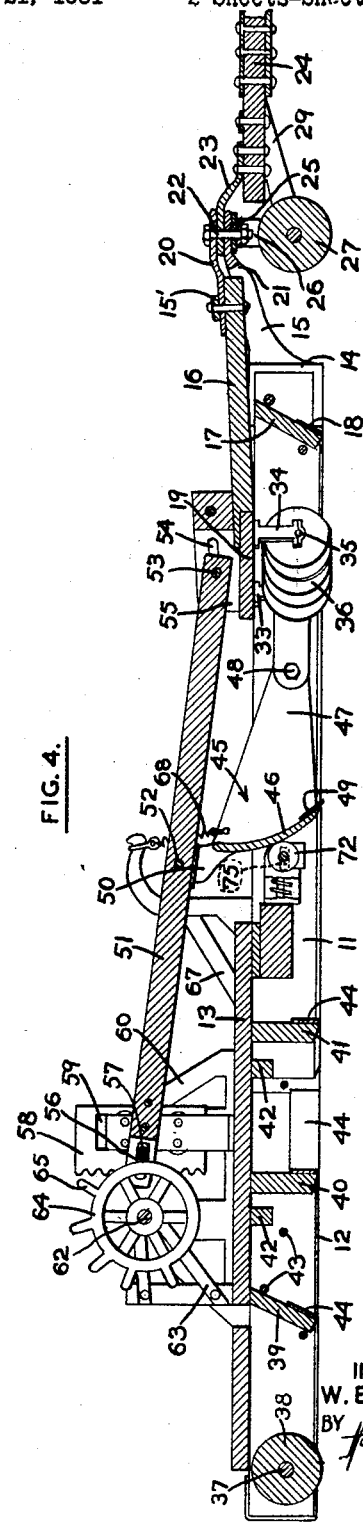

My invention is illustrated in the accompanying drawings in which:

Fig. 1 is a plan of the device.
Fig. 2 is a reverse view from underneath.
Fig. 3 is a side elevation.
Fig. 4 is a longitudinal section on the line 4—4 of Fig. 1 in the direction of the arrows.

My invention employs a pair of heavy parallel skids 11 which form a supporting structure, these being provided with wear resisting runners 12 and supporting a deck 13, this latter being built on top of the rear portion of the skids. At the front of the skids there is a heavy projecting band of metal 14, from which there extend strap iron pieces 15, which, by means of a metal crosspiece 15', connect to the draw bar 16. This draw bar is attached to the upper edge of a transverse blade member 17, this being formed of wood and having a metal wearing edge 18. The rear end of the draw bar is connected to a cross beam 19. A strap 20 extends forwardly from the front end of the draw bar and is joined to the forward end 21 of the strap members 15 by a king bolt 22 which extends through these straps, and also through a bar 23 which is attached to a draw beam 24. The king bolt also engages a cross bar 25 which has down turned ends 26 and has a roller 27 journalled on an axle 28 in these down turned ends.

There are side braces 29 which extend from the axle to the draw beam 24. The draw beam has a pin 30 to connect to a tractor.

Attached to the under side of the cross beam 19 there are a pair of brackets 33 and 34 which form journals for the shafts 35, these shafts carrying disks 36 positioned to turn the surface soil inwardly. The lower edge of the disks extends slightly below the lower edge of the skids.

At the rear end of the skids there is an axle 37 having a roller 38, which roller extends slightly below the lower edge of the skids, and forward of this roller there is a fixed, transverse, wooden blade 39; forward of this, extending from one of the skids there is a fixed, inclined blade 40, and from the opposite skid there is another fixed, inclined blade 41. These blades each have a brace 42 extending to the skid to which they are attached. There are a series of bolts 43 extending between the skids and securely bolting the skids and the various blades together. The fixed, wooden blades are provided with wear strips 44.

A cutting and transporting blade construction designated generally by the numeral 45 has a curved, transverse blade 46 attached at opposite sides to metal plates 47, which plates are attached to pivot bolts 48, there being one bolt on each skid. This blade is provided with a wearing edge 49. Attached to the upper part of the blade there is a bracket structure 50 which has a beam 51 pivotally connected thereto by a pivot bolt 52. The forward end of this beam has a bolt 53 which slides in slots 54 in side plates 55, which are bolted to the draw bar 16.

The rear end of the beam has a pair of slotted plates 56 attached thereto, through the slots of which there extends a cross rod 57. This rod extends to slidable racks 58 which are mounted in guides 59 carried by the heavy side bracket 60. The rods are also braced by cross braces 61 which extend from the rack so that on elevation and lowering of the rack the blade 46 is raised or lowered. The arrangement for operating the racks is as follows:

There is a cross shaft 62 which is journalled in the brackets 60 at the sides and adjacent the center. This shaft also has additional bearings on the brackets 63. A wheel 64 having hand grips 65 is attached to the shaft to rotate same and operate the large gears 66 which mesh with the racks. Therefore, by rotating the hand wheel the gears 66 are rotated and, hence, the racks 58 are raised or lowered.

In order to give a resilient mounting for the blade 46, there are side brackets 67 attached to each of the skids, and a spring 68 is attached to the upper end of these brackets and extends to the side plates 47 connecting the blade 46 with the pivot bolts 48.

In order to partially take up the thrust on the blade 46 when it is scraping the dirt and carrying a load of dirt, I provide a block 69 on the bottom of the deck. This has two guide straps 70 attached to each side and a single abutment 71 extending therefrom. A pair of rollers 72 are mounted on a shaft 73, which shaft has U-shaped straps 74 at the end, which are guided along the guide straps 70, the shaft extending through slots 75 and these straps.

These U-shaped straps have an abutment angle 76 connected thereto and there is a compression spring 77 wound on a guide pin 78 attached to the angle abutment 76 and extending through perforations in the angle abutment 71. This construction allows the rollers 72 to have a constant bearing on the back of the blade 46. The pressure is taken by the springs and, hence, as the blade 46 is lowered, the springs are compressed to a greater extent than when the blade is raised, thus taking the pressure off the pivot bolts 48.

My land leveler is intended to be made about four times as long as it is wide. The roller in front supports the forward end of the skids. The transverse blade 17 obtains the first leveling cut on the soil. After this the soil is acted on by the disks which cut the surface soil and tend to turn this to the center. The shiftable blade 46 may be used to cut the soil to varying depths and may be adjusted to cut off the high points of ridges and to carry the surface soil so cut to low places, where it will be deposited by sifting underneath this blade. After this the soil is acted upon by the inclined blades 41 and 40 which have a spreading action, and then by the straight, transverse blade 39, after which the soil is compacted by the trailing roller 38.

One feature of making the leveler of such a considerable length is so that small irregularities of the ground do not affect the direct motion or inclination of the skids to a material extent.

Various changes may be made in the details of construction without departing from the spirit or scope of the invention as defined by the appended claims.

I claim:

1. A land leveler having a pair of side skids, a draw bar connected to said skids, a set of harrowing disks mounted between the skids at their forward portion, and a plurality of fixed blades inclined to the skids and overlapping each other.

2. A land leveler having a pair of side skids with a draw bar connected thereto, a set of harrowing disks mounted at the forward portion of the skids, an adjustable cutting and scraping blade pivotally mounted on the skids with means to adjust the cut of said blade, and a plurality of fixed blades secured to the skids and extending partly transversely across the skids at an inclination thereto.

3. A land leveler having a pair of skids with a draw bar connected thereto, a transverse, leveling blade between the skids at the front, a plurality of harrowing disks mounted at the forward portion of the skids behind the said fixed blade, a pivotally mounted cutting or transporting blade having means to regulate the depth of cut, positioned about the center of the skids, a set of trailing, fixed blades at an inclination to the skids extending partly transversely thereacross, and a fixed, transverse blade adjacent the rear end of the skids.

4. A land leveler having a pair of skids with a draw bar connected thereto having a king bolt, a roller connected to a draw beam and mounted substantially directly below the king bolt, a second roller at the back of the skids, a first, fixed, transverse blade at the front of the skid, a plurality of harrowing disks arranged behind the fixed blade, a cutting and lifting blade pivotally mounted on the skids with means to adjust the cut of said blade and located about the center of the skids, a pair of inclined blades, each secured to a skid and extending partly toward the other skid, and a second, fixed, transverse blade secured to the rear portion of the skids forward of the second roller.

5. A land leveler having a pair of side skids, strap structures connected to the forward end, and having a draw bar secured thereto, said straps having a king pin, a draw beam connected to the king pin and having a first roller connected thereto vertically below the king pin, a first, fixed, transverse cutting blade secured to the skids at the forward portion, a pair of sets of harrowing disks, each set of disks being mounted at an inclination to the skids to turn the soil inwardly, a cutting and transporting blade having side members pivotally connected to the skids, a pivotally mounted beam connected to said blade and means to raise and lower the said beam, a deck on the rear portion of the said skids, a pair of inclined blades secured to the skids and to the deck and extending part way between the skids, a rear, transverse scraping blade, and a roller connected between the skids at the rear portion thereof.

6. A land leveler as claimed in claim 5, means to raise and lower the beam comprising a pair of racks mounted in a vertical guide structure and having a cross rod connected to the beam, and a shaft having gear wheels to mesh with the said pinions for raising and lowering the beam.

7. In a land leveler having a pair of skids a transverse cutting and carrying blade having a curvature from its cutting edge to the top, metal plates secured to the sides of the blade and pivotally connected to the skids, means to raise and lower the said blade, pressure rollers slidably mounted rearwardly of the said blade and engaging the curved portion thereof.

8. In a land leveler, a pair of skids, a cutting and transporting blade having a convex curvature toward the rear and having side plates pivotally connected to the skids, a beam pivotally connected adjacent the forward portion of the skids and having means to raise and lower the blade adjacent the rear portion of the skids, a connection between the beam and the blade, rollers having a sliding mounting in position to bear on the convex side of the blade, and springs to press the rollers in contact with the blade.

9. In a land leveler as claimed in claim 8, a means to raise and lower the beam comprising a pair of racks mounted in a guide structure on the skids, a rotatable shaft journalled in brackets and having an operating hand wheel with gears to mesh with the racks, and a rod extending between the racks and operatively connected to the beam.

10. In a land leveler having a pair of skids, a cutting and transporting blade having a pair of side plates pivotally connected to the skids, a beam having a pin and slot connection with the forward ends of the skids, brackets connected to the rear portion of the skids, guide frames secured in said brackets, a pair of racks vertically slidable and having a connecting rod, there being a slot in the rear end of the beam to engage the said rod, a connection from the beam to the blade, a shaft rotatably mounted in suitable journals and having an operating hand wheel and gears to operate the said racks whereby the said beam may be raised and lowered.

11. In a land leveler as claimed in claim 10, the blade having a convex rear surface, a pair of guide brackets secured to the skids and having rollers slidably mounted in said brackets, and springs to thrust said rollers against the convex side of said blade.

In testimony whereof I have signed my name to this specification.

WILLIAM E. FISHER.